United States Patent
Guo

(10) Patent No.: US 11,885,932 B2
(45) Date of Patent: Jan. 30, 2024

(54) CAMERA OPTICAL LENS

(71) Applicant: AAC Optics (Suzhou) Co., Ltd., Suzhou (CN)

(72) Inventor: Yutong Guo, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 518 days.

(21) Appl. No.: 17/134,510

(22) Filed: Dec. 28, 2020

(65) Prior Publication Data

US 2022/0066166 A1 Mar. 3, 2022

(30) Foreign Application Priority Data

Sep. 3, 2020 (CN) .......................... 202010917536.5

(51) Int. Cl.
  *G02B 13/00* (2006.01)
  *G02B 9/60* (2006.01)
(52) U.S. Cl.
  CPC ........... *G02B 13/0045* (2013.01); *G02B 9/60* (2013.01)

(58) Field of Classification Search
  CPC .... G02B 13/0045; G02B 13/04; G02B 13/06; G02B 9/60
  See application file for complete search history.

(56) References Cited

U.S. PATENT DOCUMENTS

2020/0241240 A1* 7/2020 Chen .................. G02B 13/0045

* cited by examiner

*Primary Examiner* — Marin Pichler
*Assistant Examiner* — Justin W. Hustoft
(74) *Attorney, Agent, or Firm* — W&G Law Group

(57) ABSTRACT

A camera optical lens is provided, including from an object side to an image side: a first lens having positive refractive power; a second lens having negative refractive power; a third lens having negative refractive power; a fourth lens having positive refractive power; and a fifth lens having negative refractive power. The camera optical lens satisfies following conditions: $-5.00 \leq f2/f \leq -2.50$; $2.00 \leq d5/d6 \leq 4.00$; $-4.00 \leq R7/R8 \leq -1.30$; and $-2.00 \leq (R1+R2)/(R1-R2) \leq -1.00$. The above camera optical lens may meet design requirements for large aperture, wide angle and ultra-thinness, while maintaining a high imaging quality.

9 Claims, 9 Drawing Sheets

CAMERA OPTICAL LENS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the development of camera technology, camera optical lenses have been widely used in various electronic products such as smart phones and digital cameras. People are increasingly pursuing lighter and thinner electronic products in order to facilitate portability, so that miniature camera lenses with good imaging quality have become a mainstream in the market.

In order to obtain better imaging quality, a camera lens traditionally equipped in a camera of a mobile phone generally constitutes three or four lenses. However, with development of technology and increase in diversified requirements of users, a camera lens constituted by five lenses gradually appears in camera design, in case that pixel area of the photosensitive device is continuously reduced and requirements on image quality is continuously increased. Although the common camera lens constituted by five lenses has good optical performances, its configurations such as refractive power, lens spacing and lens shape still need to be optimized, therefore the camera lens may not meet design requirements for some optical performances such as large aperture, wide angle and ultra-thinness while maintaining good imaging quality.

Therefore, it is necessary to provide a camera optical lens that may meet design requirements for large aperture, wide angle and ultra-thinness while maintaining good imaging quality.

SUMMARY

In view of the above problems, the present invention provides a camera optical lens, which may meet design requirements for large aperture, wide angle and ultra-thinness.

Embodiments of the present invention provides a camera optical lens, including from an object side to an image side:
a first lens having positive refractive power;
a second lens having negative refractive power;
a third lens having negative refractive power;
a fourth lens having positive refractive power; and
a fifth lens having negative refractive power,
wherein the camera optical lens satisfies following conditions:

$-5.00 \leq f2/f \leq -2.50$;

$2.00 \leq d5/d6 \leq 4.00$;

$-4.00 \leq R7/R8 \leq -1.30$; and $-2.00 \leq (R1+R2)/(R1-R2) \leq -1.00$, where
f denotes a total focal length of the camera optical lens;
f2 denotes a focal length of the second lens;
R1 denotes a curvature radius of an object side surface of the first lens;
R2 denotes a curvature radius of an image side surface of the first lens;
R7 denotes a curvature radius of an object side surface of the fourth lens;
R8 denotes a curvature radius of an image side surface of the fourth lens;
d5 denotes an on-axis thickness of the third lens; and
d6 denotes an on-axis distance from an image side surface of the third lens to the object side surface of the fourth lens.

As an improvement, the camera optical lens satisfies a following condition:

$-1.50 \leq f5/f \leq -0.50$, where f5 denotes a focal length of the fifth lens.

As an improvement, the camera optical lens satisfies following conditions:

$0.40 \leq f1/f \leq 1.38$; and $0.09 \leq d1/TTL \leq 0.40$, where
f1 denotes a focal length of the first lens;
d1 denotes an on-axis thickness of the first lens; and
TTL denotes a total optical length from the object side surface of the first lens to an image plane of the camera optical lens along an optic axis.

As an improvement, the camera optical lens satisfies following conditions:

$-7.46 \leq (R3+R4)/(R3-R4) \leq 2.33$; and $0.02 \leq d3/TTL \leq 0.07$, where
R3 denotes a curvature radius of an object side surface of the second lens;
R4 denotes a curvature radius of an image side surface of the second lens;
d3 denotes an on-axis thickness of the second lens; and
TTL denotes a total optical length from the object side surface of the first lens to an image plane of the camera optical lens along an optic axis.

As an improvement, the camera optical lens satisfies following conditions:

$-12.02 \leq f3/f \leq -1.35$;

$0.52 \leq (R5+R6)/(R5-R6) \leq 6.70$; and $0.04 \leq d5/TTL \leq 0.23$, where
f3 denotes a focal length of the third lens;
R5 denotes a curvature radius of an object side surface of the third lens;
R6 denotes a curvature radius of the image side surface of the third lens; and
TTL denotes a total optical length from the object side surface of the first lens to an image plane of the camera optical lens along an optic axis.

As an improvement, the camera optical lens satisfies following conditions:

$0.40 \leq f4/f \leq 2.56$;

$0.07 \leq (R7+R8)/(R7-R8) \leq 0.89$; and $0.04 \leq d7/TTL \leq 0.25$, where f4 denotes a focal length of the fourth lens;

d7 denotes an on-axis thickness of the fourth lens; and

TTL denotes a total optical length from the object side surface of the first lens to an image plane of the camera optical lens along an optic axis.

As an improvement, the camera optical lens satisfies following conditions:

$$0.59 \le (R9+R10)/(R9-R10) \le 5.58; \text{ and}$$

$$0.04 \le d9/TTL \le 0.12,$$

where

R9 denotes a curvature radius of an object side surface of the fifth lens;

R10 denotes a curvature radius of an image side surface of the fifth lens;

d9 denotes an on-axis thickness of the fifth lens; and

TTL denotes a total optical length from the object side surface of the first lens to an image plane of the camera optical lens along an optic axis.

As an improvement, the camera optical lens further satisfies a following condition:

$$FNO \le 2.60,$$

where FNO denotes an F number of the camera optical lens.

As an improvement, the camera optical lens further satisfies a following condition:

$$FOV \ge 67.00°,$$

where FOV denotes a field of view of the camera optical lens.

As an improvement, the camera optical lens satisfies a following condition:

$$TTL/IH \le 1.70,$$

where

IH denotes an image height of the camera optical lens; and

TTL denotes a total optical length from the object side surface of the first lens to an image plane of the camera optical lens along an optic axis.

The present invention has following beneficial effects: the camera optical lens according to the present invention may meet design requirements for large aperture, wide angle and ultra-thinness while maintaining good imaging quality, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
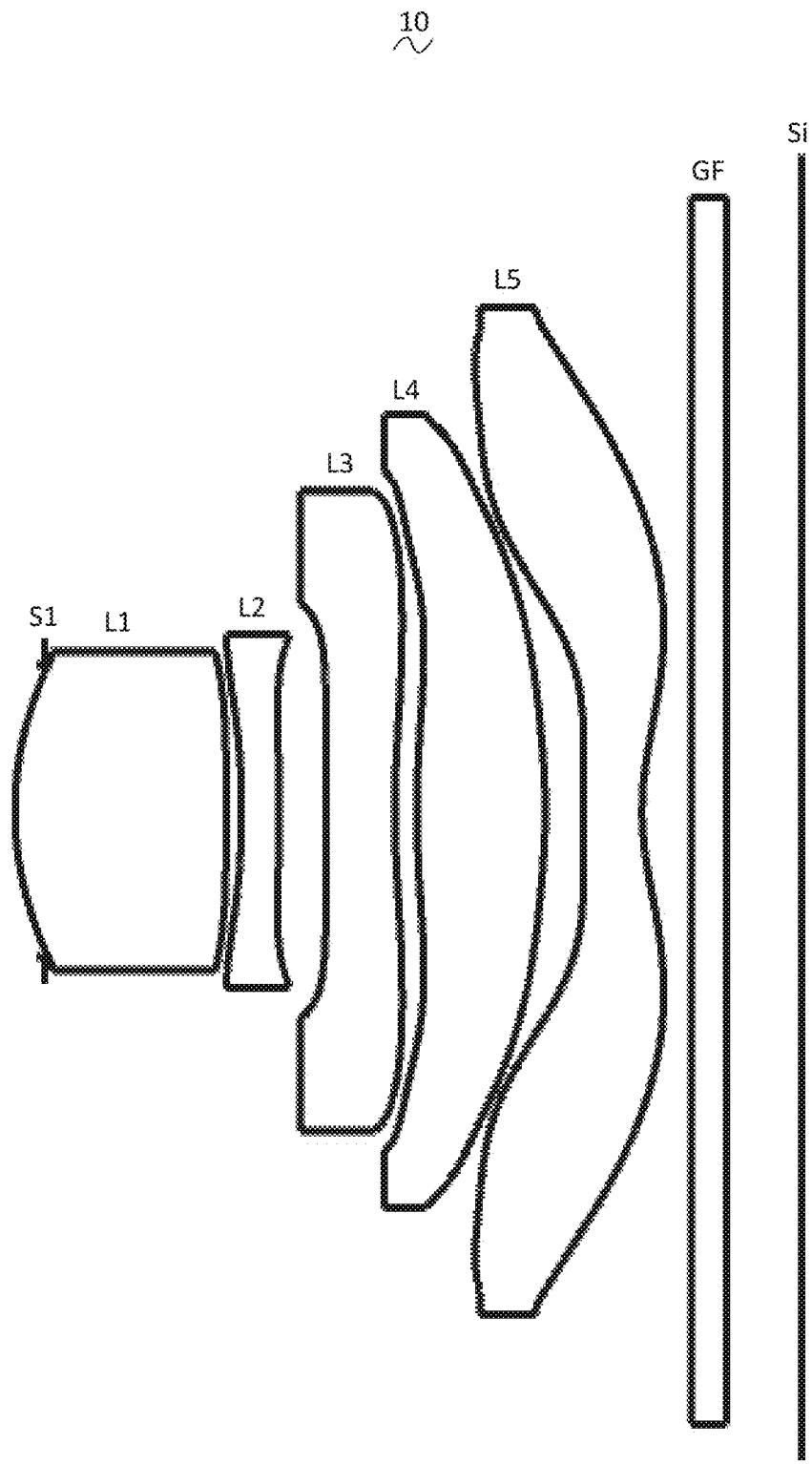
FIG. 1 is a structural schematic diagram of a camera optical lens according to Embodiment 1 of the present invention.

Referring to FIG. 1 to FIG. 4, the present invention provides a camera optical lens 10 according to Embodiment 1. In FIG. 1, a left side is an object side, and a right side is an image side. The camera optical lens 10 includes five lenses. The camera optical lens 10 includes, from the object side to the image side, an aperture S1, a first lens L1, a second lens L2, a third lens L3, a fourth lens L4, and a fifth lens L5. A glass plate GF may be arranged between the fifth lens L5 and an image plane Si. The glass plate GF may be a cover glass or an optical filter.

In this embodiment, the first lens L1 has positive refractive power, the second lens L2 has negative refractive power, the third lens L3 has negative refractive power, the fourth lens L4 has positive refractive power, and the fifth lens L5 has negative refractive power.

In this embodiment, the first lens L1, the second lens L2, the third lens L3, the fourth lens L4 and the fifth lens L5 are each made of a plastic material.

Here, a total focal length of the camera optical lens 10 is defined as f, a focal length of the second lens L2 is defined as f2, a curvature radius of an object side surface of the first lens L1 is defined as R1, a curvature radius of an image side surface of the first lens L1 is defined as R2, a curvature radius of an object side surface of the fourth lens L4 is defined as R7, a curvature radius of an image side surface of the fourth lens L4 is defined as R8, an on-axis thickness of the third lens L3 is defined as d5, and an on-axis distance from an image side surface of the third lens L3 to an object side surface of the fourth lens L4 is defined as d6. The focal length f2 and the focal length f, the on-axis thickness d5 and the on-axis distance d6, the curvature radius R7 and the curvature radius R8, and the curvature radius R1 and the curvature radius R2 satisfy following conditions, respectively:

$$-5.00 \leq f2/f \leq -2.50 \quad (1),$$

$$2.00 \leq d5/d6 \leq 4.00 \quad (2),$$

$$-4.00 \leq R7/R8 \leq -1.30 \quad (3), \text{ and}$$

$$-2.00 \leq (R1+R2)/(R1-R2) \leq -1.00 \quad (4).$$

Here, the condition (1) specifies a ratio of the focal length f2 of the second lens L2 to the total focal length f of the camera optical lens 10. Within the range of the condition (1), it is beneficial to correct aberrations and improve imaging quality.

Within the range of the condition (2), it is beneficial to process the lenses and assemble the camera optical lens.

The condition (3) specifies a shape of the fourth lens L4. Within the range of the condition (3), a degree of deflection of light passing through the lens may be alleviated, and aberrations may be effectively reduced.

The condition (4) specifies a shape of the first lens L1. Within the range of the condition (4), it is beneficial to correct spherical aberration and improve imaging quality.

The total focal length of the camera optical lens 10 is defined as f, and the focal length of the fifth lens L5 is defined as f5. The focal length f and the focal length f5 satisfy a following condition: $-1.50 \leq f5/f \leq -0.50$, which specifies a ratio of the focal length f5 of the fifth lens L5 to the total focal length f of the camera optical lens 10. Within the range of the above condition, it is beneficial to correct field curvature.

In this embodiment, the object side surface of the first lens L1 is convex in a paraxial region, and the image side surface of the first lens L1 is concave in the paraxial region.

The total focal length of the camera optical lens 10 is defined as f, and a focal length of the first lens L1 is defined as f1. The focal length f and the focal length f1 satisfy a following condition: $0.40 \leq f1/f \leq 1.38$, which specifies a ratio of the focal length of the first lens L1 to the total focal length f of the camera optical lens 10. Within the range of the above condition, the first lens L1 has an appropriate negative refractive power, so that it is beneficial to reduce aberrations of the system and facilitate developing ultra-thinness and wide angle of the camera optical lens. Optionally, the focal length f and the focal length f1 satisfy a following condition: $-0.63 \leq f1/f \leq 1.11$.

An on-axis thickness of the first lens L1 is defined as d1, and a total optical length from the object side surface of the first lens to an image plane of the camera optical lens 10 along an optic axis is defined as TTL. The on-axis thickness d1 and the total optical length TTL satisfy a following condition: $0.09 \leq d1/TTL \leq 0.40$. Within the range of the condition, it is beneficial to achieve an ultra-thinness effect. Optionally, the on-axis thickness d1 and the total optical length TTL satisfy a following condition: $0.14 \leq d1/TTL \leq 0.32$.

In this embodiment, the object side surface of the second lens L2 is concave in a paraxial region, and the image side surface of the second lens L2 is convex in the paraxial region.

A curvature radius of an object side surface of the second lens L2 is defined as R3, and a curvature radius of an image side surface of the second lens L2 is defined as R4. The curvature radius R3 and the curvature radius R4 satisfy a following condition: $-7.46 \leq (R3+R4)/(R3-R4) \leq 2.33$, which specifies a shape of the second lens L2. Within the range of the above condition, as the lens becomes ultra-thinness and wide angle, it is beneficial to correct on-axis chromatic aberration. Optionally, the curvature radius R3 and the curvature radius R4 satisfy a following condition: $-4.66 \leq (R3+R4)/(R3-R4) \leq 1.86$.

An on-axis thickness of the second lens L2 is defined as d3, and a total optical length from the object side surface of the first lens to an image plane of the camera optical lens 10 along an optic axis is defined as TTL. The total optical length TTL and the on-axis thickness d3 satisfy a following condition: $0.02 \leq d3/TTL \leq 0.07$. Within the range of the above condition, it is beneficial to achieve an ultra-thinness effect. Optionally, the total optical length TTL and the on-axis thickness d3 satisfy a following condition: $0.03 \leq d3/TTL \leq 0.06$.

In this embodiment, the object side surface of the third lens L3 is convex in a paraxial region, and the image side surface of the third lens L3 is concave in the paraxial region.

The total focal length of the camera optical lens 10 is defined as f, and a focal length of the third lens L3 is defined as f3. The focal length f and the focal length f3 satisfy a following condition: $-12.02 \leq f3/f \leq -1.35$. With appropriate configuration of the negative refractive power of the third lens L3, the camera optical lens 10 may obtain better imaging quality and lower sensitivity. Optionally, the focal length f and the focal length f3 satisfy a following condition: $-7.51 \leq f3/f \leq -1.69$.

A central curvature radius of an object side surface of the third lens L3 is defined as R5, and a central curvature radius of an image side surface of the third lens L3 is defined as R6. The central curvature radius R5 and the central curvature radius R6 satisfy a following condition: $0.52 \leq (R5+R6)/(R5-R6) \leq 6.70$. A shape of the third lens may be effectively controlled, so that it is beneficial to process the third lens L3. Within the specified range of the condition, a degree of deflection of light passing through the lens may be alleviated, and aberrations may be effectively reduced. Optionally, the central curvature radius R5 and the central curvature radius R6 satisfy a following condition: $0.84 \leq (R5+R6)/(R5-R6) \leq 5.36$.

The total optical length from the object side surface of the first lens to an image plane of the camera optical lens 10 along an optic axis is defined as TTL, and an on-axis thickness of the third lens L3 is defined as d5. The total optical length TTL and the on-axis thickness d5 satisfy a following condition: $0.04 \leq d5/TTL \leq 0.23$. Within the range of the above condition, it is beneficial to achieve an ultra-thinness effect. Optionally, the total optical length TTL and the on-axis thickness d5 satisfy a following condition: $0.07 \leq d5/TTL \leq 0.18$.

In this embodiment, the object side surface of the fourth lens L4 is convex in a paraxial region, and the image side surface of the fourth lens L4 is convex in the paraxial region.

A total focal length of the camera optical lens 10 is defined as f, a focal length of the fourth lens L4 is defined as f4. The focal length f and the focal length f4 satisfy a following condition: $0.40 \leq f4/f \leq 2.56$, which specifies a ratio of the focal length f4 of the fourth lens L4 to the total focal length f of the camera optical lens 10. With appropriate configuration of the refractive power, the system may obtain better imaging quality and lower sensitivity. Optionally, the focal length f and the focal length f4 satisfy a following condition: $0.64 \leq f4/f \leq 2.05$.

A curvature radius of the object side surface of the fourth lens L4 is defined as R7, and a curvature radius of the image side surface of the fourth lens L4 is defined as R8. The curvature radius R7 and the curvature radius R8 satisfy a following condition: 0.07≤(R7+R8)/(R7−R8)≤0.89, which specifies a shape of the fourth lens L4. Within the range of the above condition, it is beneficial to correct aberration of off-axis angle with the development of ultra-thinness and wide angle. Optionally, the curvature radius R7 and the curvature radius R8 satisfy a following condition: 0.11≤(R7+R8)/(R7−R8)≤0.71.

An on-axis thickness of the fourth lens L4 is defined as d7, and a total optical length from the object side surface of the first lens to an image plane of the camera optical lens 10 along an optic axis is defined as TTL. The on-axis thickness d7 and the total optical length TTL satisfy a following condition: 0.04≤d7/TTL≤0.25. Within the range of the condition, it is beneficial to achieve an ultra-thinness effect. Optionally, the on-axis thickness d7 and the total optical length TTL satisfy a following condition: 0.07≤d7/TTL≤0.20.

In this embodiment, the object side surface of the fifth lens L5 is convex in a paraxial region, and the image side surface of the fifth lens L5 is concave in the paraxial region.

A curvature radius of an object side surface of the fifth lens L5 is defined as R9, and a curvature radius of an image side surface of the fifth lens L5 is defined as R10. The curvature radius R9 and the curvature radius R10 satisfy a following condition: 0.59≤(R9+R10)/(R9−R10)≤5.58, which specifies a shape of the fifth lens L5. Within the range of the above condition, it is beneficial to correct aberration of off-axis angle with the development of ultra-thinness and wide angle. Optionally, the curvature radius R9 and the curvature radius R10 satisfy a following condition: 0.94≤(R9+R10)/(R9−R10)≤4.47.

An on-axis thickness of the fifth lens L5 is defined as d9, and a total optical length from the object side surface of the first lens to an image plane of the camera optical lens 10 along an optic axis is defined as TTL. The on-axis thickness d9 and the total optical length TTL satisfy a following condition: 0.04≤d9/TTL≤0.12. Within the range of the above condition, it is beneficial to achieve an ultra-thinness effect. Optionally, the total optical length TTL and the on-axis thickness d9 satisfy a following condition: 0.06≤d9/TTL≤0.09.

In this embodiment, an image height of the camera optical lens 10 is defined as IH. The total optical length TTL and the image height IH satisfy a following condition: TTL/IH≤1.70. Within the range of the above condition, it is beneficial to achieve an ultra-thinness effect.

In this embodiment, an F number FNO of the camera optical lens 10 is less than or equal to 2.60, so that a large aperture is achieved.

In this embodiment, a field of view FOV of the camera optical lens 10 is greater than or equal to 67.00°, so that a wide-angle effect may be achieved.

In this embodiment, a total focal length of the camera optical lens 10 is defined as f, and a combined focal length of the first lens L1 and the second lens L2 is defined as f12. The focal length f and the combined focal length f12 satisfy a following condition: 0.47≤f12/f≤1.63. Within the range of the above condition, the aberration and distortion of the camera optical lens 10 may be eliminated, and a back focal length of the camera optical lens 10 may be suppressed, so that miniaturization of an imaging lens system may be maintained. Optionally, the focal length f and the combined focal length f12 satisfy a following condition: 0.76≤f12/f≤1.31.

In addition, in the camera optical lens 10 provided by this embodiment, the surface of each lens may be configured to be an aspherical surface. The aspherical surface may be easily made into a shape other than a spherical surface, so that more control variables may be obtained to subtract aberrations, thereby reducing the number of lens used. Therefore, a total length of the camera optical lens 10 may be effectively reduced. In this embodiment, each of the object side surface and the image side surface of each lens is an aspherical surface.

It is worth mentioning that, since the first lens L1, the second lens L2, the third lens L3, the fourth lens L4, and the fifth lens L5 have the aforementioned structure and parameter relationship, the camera optical lens 10 may appropriately configure the refractive power, spacing and shape of each lens, so that various aberrations are corrected accordingly.

In this way, the camera optical lens 10 may meet the design requirements for large aperture, wide angle and ultra-thinness while maintaining good optical performances.

The camera optical lens 10 of the present invention will be described below with examples. The symbols recorded in each example will be described as follows. The focal length, on-axis distance, curvature radius, on-axis thickness, inflection point position, and arrest point position are each in units of millimeter (mm).

TTL denotes a total optical length from the object side surface of the first lens to an image plane Si of the camera optical lens 10 along an optic axis, with a unit of millimeter (mm);

F number FNO denotes a ratio of an effective focal length of the camera optical lens to an entrance pupil diameter.

In addition, at least one of the object side surface and image side surface of each lens may also be provided with inflection points and/or arrest points in order to meet high-quality imaging requirements. The description below may be referred to in specific embodiments as follows.

The design data of the camera optical lens 10 in FIG. 1 are shown below.

Table 1 shows the curvature radius R of the object side surface and the image side surface of the first lens L1 to the fifth lens L5 which constitute the camera optical lens 10 according to Embodiment 1 of the present invention, the on-axis thickness of each lens, and the distance d between two adjacent lenses, refractive indexes nd and Abbe numbers vd. It should be noted that R and d are both are each in unit of millimeter (mm) in this embodiment.

TABLE 1

| | R | d | | nd | | vd |
|---|---|---|---|---|---|---|
| S1 | ∞ | d0 = | −0.172 | | | |
| R1 | 1.598 | d1 = | 1.230 | nd1 | 1.5450 | v1 55.81 |
| R2 | 53.843 | d2 = | 0.091 | | | |
| R3 | −3.870 | d3 = | 0.218 | nd2 | 1.6700 | v2 19.39 |
| R4 | −6.705 | d4 = | 0.272 | | | |
| R5 | 206.507 | d5 = | 0.402 | nd3 | 1.6700 | v3 19.39 |
| R6 | 5.036 | d6 = | 0.128 | | | |
| R7 | 5.277 | d7 = | 0.750 | nd4 | 1.6359 | v4 23.82 |
| R8 | −2.864 | d8 = | 0.222 | | | |
| R9 | 16.596 | d9 = | 0.341 | nd5 | 1.6153 | v5 25.94 |
| R10 | 1.322 | d10 = | 0.283 | | | |
| R11 | ∞ | d11 = | 0.210 | ndg | 1.5168 | vg 64.17 |
| R12 | ∞ | d12 = | 0.440 | | | |

The reference signs in Table 1 are explained as follows.
S1: aperture;
R: central curvature radius of an optical surface;
R1: curvature radius of the object side surface of the first lens L1;

R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the optical filter GF;
R12: curvature radius of the image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image plane Si;
nd: refractive index of a d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
ndg: refractive index of the d-line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
vg: Abbe number of the optical filter GF.

Table 2 shows aspherical surface data of each lens in the camera optical lens 10 according to Embodiment 1 of the present invention.

TABLE 2

| | Conic coefficient | Aspherical surface coefficient | | | | |
|---|---|---|---|---|---|---|
| | k | A4 | A6 | A8 | A10 | A12 |
| R1 | 1.8628E+00 | −5.5027E−02 | 1.3524E−01 | −3.4098E+00 | 2.2015E+01 | −7.6784E+01 |
| R2 | 1.0172E+02 | −2.5093E−02 | −2.1460E+00 | 1.5486E+01 | −6.6312E+01 | 1.7957E+02 |
| R3 | −2.1590E+01 | 5.0119E−02 | −1.9515E+00 | 1.1327E+01 | −3.5517E+01 | 7.0875E+01 |
| R4 | −1.0129E+02 | 2.2342E−01 | −1.5629E+00 | 8.4684E+00 | −2.6621E+01 | 5.5290E+01 |
| R5 | −4.9669E+01 | 5.4313E−02 | −2.0377E−01 | −3.6956E−01 | 2.6786E+00 | −5.9788E+00 |
| R6 | 2.1535E+00 | 6.3499E−03 | −3.2295E−01 | 5.4825E−01 | −4.4672E−01 | 1.8149E−01 |
| R7 | −7.7190E+01 | 8.5292E−02 | −2.7816E−01 | 2.1181E−01 | 5.1506E−02 | −2.1849E−01 |
| R8 | −1.7248E+01 | 1.6051E−01 | −3.7212E−01 | 3.7049E−01 | −2.1934E−01 | 8.3313E−02 |
| R9 | −7.0712E+01 | −1.7338E−01 | −1.9188E−01 | 2.8958E−01 | −1.5997E−01 | 5.0448E−02 |
| R10 | −5.5445E+00 | −2.2582E−01 | 1.3501E−01 | −6.0124E−02 | 1.9100E−02 | −3.9707E−03 |

| | Conic coefficient | Aspherical surface coefficient | | | |
|---|---|---|---|---|---|
| | k | A14 | A16 | A18 | A20 |
| R1 | 1.8628E+00 | 1.5553E+02 | −1.8340E+02 | 1.1613E+02 | −3.0415E+01 |
| R2 | 1.0172E+02 | −3.0559E+02 | 3.1612E+02 | −1.8199E+02 | 4.4902E+01 |
| R3 | −2.1590E+01 | −8.9886E+01 | 6.8982E+01 | −2.9119E+01 | 5.2875E+00 |
| R4 | −1.0129E+02 | −7.5800E+01 | 6.5472E+01 | −3.2031E+01 | 6.7194E+00 |
| R5 | −4.9669E+01 | 6.9664E+00 | −4.4751E+00 | 1.4231E+00 | −1.5888E−01 |
| R6 | 2.1535E+00 | −2.0073E−02 | −1.1971E−02 | 4.7861E−03 | −5.3895E−04 |
| R7 | −7.7190E+01 | 1.7129E−01 | −6.4650E−02 | 1.2212E−02 | −9.2671E−04 |
| R8 | −1.7248E+01 | −2.1254E−02 | 3.7080E−03 | −4.1199E−04 | 2.1666E−05 |
| R9 | −7.0712E+01 | −9.8918E−03 | 1.1943E−03 | −8.1322E−05 | 2.3889E−06 |
| R10 | −5.5445E+00 | 4.6979E−04 | −2.0661E−05 | −1.0869E−06 | 1.0518E−07 |

In Table 2, k denotes a conic coefficient, and A4, A6, A8, A10, A12, A14, A16, A18 and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (5).$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (5). However, the present invention is not limited to the aspherical polynomial form shown in the formula (5).

Design data of the inflection point and the arrest point of each lens in the camera optical lens 10 according to Embodiment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. P5R1 and P5R2 denote the object side surface and image side surface of the fifth lens L5, respectively. Data in an "inflection point position" column are a vertical distance from an inflexion point provided on a surface of each lens to the optical axis of the camera optical lens 10. Data in an "arrest point position" column are a vertical distance from an arrest point provided on the surface of each lens to the optical axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 1 | 0.135 | / | / | / |
| P2R1 | 1 | 0.595 | / | / | / |
| P2R2 | 1 | 0.345 | / | / | / |
| P3R1 | 1 | 0.335 | / | / | / |
| P3R2 | 1 | 0.475 | / | / | / |
| P4R1 | 3 | 0.505 | 1.345 | 1.515 | / |
| P4R2 | 3 | 1.635 | 1.745 | 2.035 | / |
| P5R1 | 4 | 0.165 | 1.195 | 2.055 | 2.125 |
| P5R2 | 4 | 0.455 | 2.205 | 2.355 | 2.495 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 2 | 0.705 | 0.795 |
| P2R2 | 1 | 0.915 | 1 |
| P3R1 | 1 | 0.485 | / |
| P3R2 | 1 | 0.445 | / |
| P4R1 | 2 | 0.825 | 1.275 |
| P4R2 | 0 | / | / |
| P5R1 | 0 | 1 | / |
| P5R2 | 1 | 0.875 | / |

In addition, Table 13 below shows numerical values according to Embodiments 1, 2, and 3 corresponding to the parameters specified in the conditions.

As shown in Table 13, Embodiment 1 satisfies various conditions.

Figure 2:
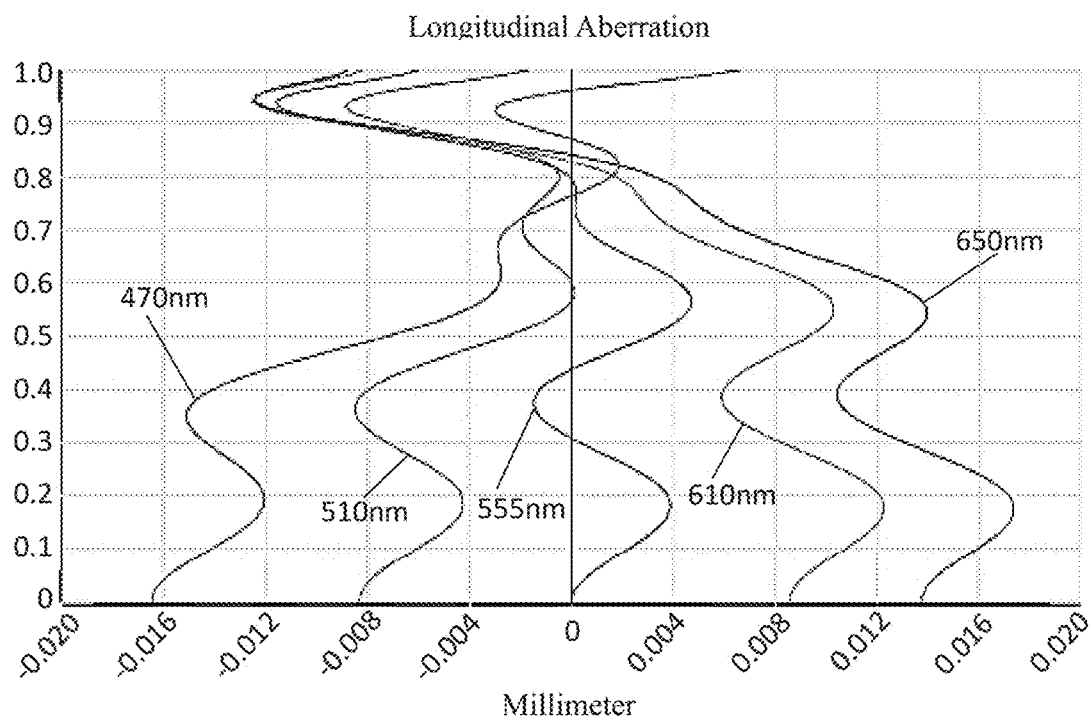
FIG. 2 is a schematic diagram of a longitudinal aberration of the camera optical lens shown in FIG. 1.
Figure 3:
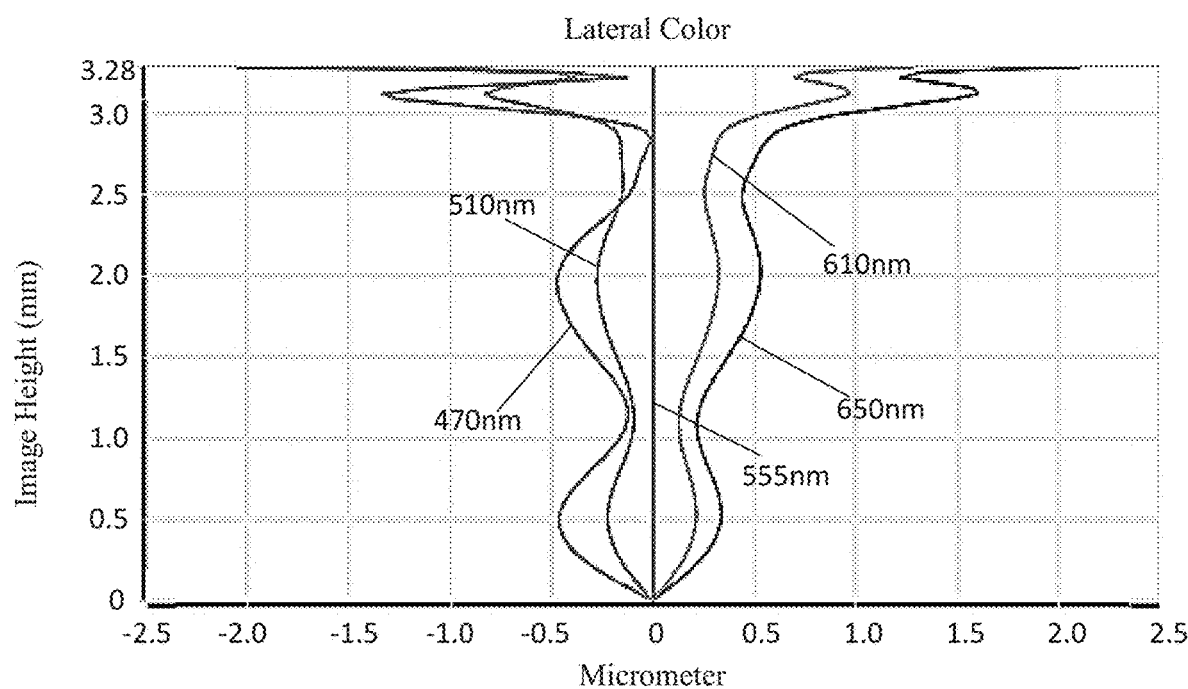
FIG. 3 is a schematic diagram of a lateral color of the camera optical lens shown in FIG. 1.
Figure 4:
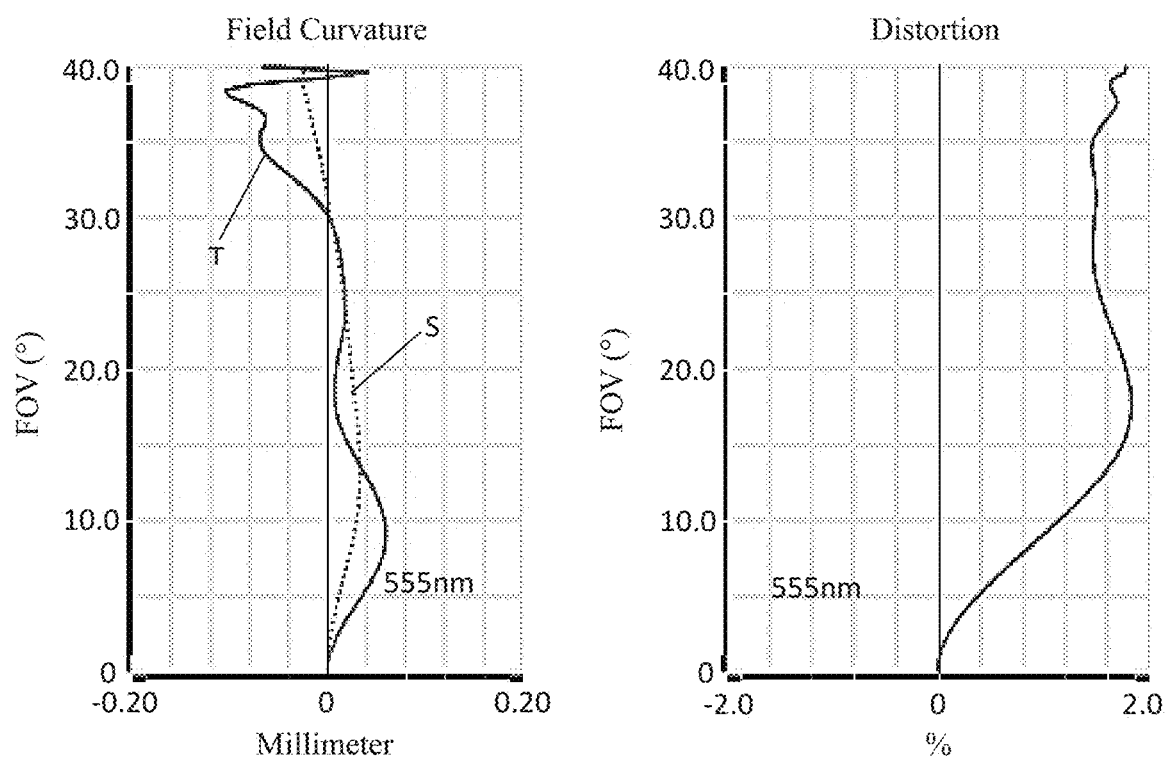
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 650 nm, 610 nm, 555 nm, 510 nm, and 470 nm passes through the camera optical lens 10, respectively. FIG. 4 is a schematic diagram of a field curvature and a distortion of the camera optical lens 10 after light having a wavelength of 555 nm passes through the camera optical lens 10. The field curvature S in FIG. 4 is a field curvature in a sagittal direction, and T is a field curvature in a meridian direction.

In this embodiment, an entrance pupil diameter ENPD of the camera optical lens 10 is 1.540 mm, a full-field image height IH is 3.282 mm, and a field of view FOV in a diagonal direction is 80.00°. The camera optical lens 10 satisfies design requirements for large aperture, wide angle and ultra-thinness. The on-axis and off-axis chromatic aberrations are fully corrected, thereby achieving excellent optical performances.

Embodiment 2

Figure 5:
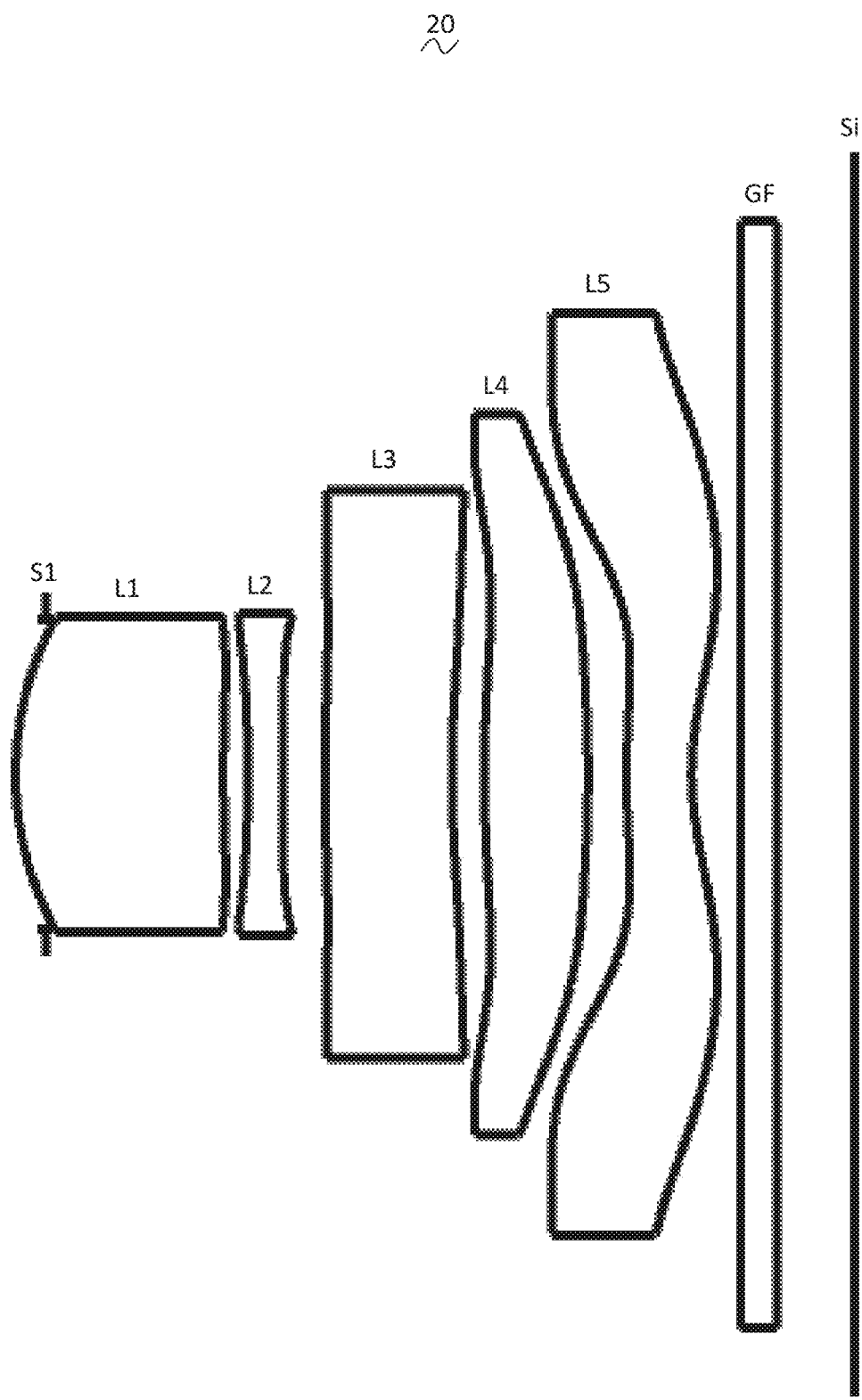
FIG. 5 is a structural schematic diagram of a camera optical lens according to Embodiment 2 of the present invention.

FIG. 5 is a structural schematic diagram of the camera optical lens 20 according to Embodiment 2. Embodiment 2 is basically the same as Embodiment 1, and involves symbols having the same meanings as Embodiment 1 which are not elaborated here, and only differences therebetween are listed below.

In this embodiment, an image side surface of a second lens L2 is concave in a paraxial region.

Design data of the camera optical lens 20 according to Embodiment 2 of the present invention are shown in Table 5 and Table 6.

TABLE 5

| | R | d | | nd | | vd | |
|---|---|---|---|---|---|---|---|
| S1 | ∞ | d0 = | −0.172 | | | | |
| R1 | 1.563 | d1 = | 1.197 | nd1 | 1.5444 | v1 | 55.82 |
| R2 | 7.578 | d2 = | 0.140 | | | | |
| R3 | −8.139 | d3 = | 0.200 | nd2 | 1.6700 | v2 | 19.39 |
| R4 | 45.274 | d4 = | 0.243 | | | | |
| R5 | 8.474 | d5 = | 0.732 | nd3 | 1.6700 | v3 | 19.39 |
| R6 | 5.374 | d6 = | 0.188 | | | | |
| R7 | 7.683 | d7 = | 0.595 | nd4 | 1.6359 | v4 | 23.82 |
| R8 | −5.865 | d8 = | 0.222 | | | | |
| R9 | 3.599 | d9 = | 0.374 | nd5 | 1.6153 | v5 | 25.94 |
| R10 | 1.398 | d10 = | 0.283 | | | | |
| R11 | ∞ | d11 = | 0.210 | ndg | 1.5168 | vg | 64.17 |
| R12 | ∞ | d12 = | 0.444 | | | | |

Table 6 shows aspherical surface data of each lens in the camera optical lens 20 according to Embodiment 2 of the present invention.

TABLE 6

| | Conic coefficient | Aspherical surface coefficient | | | | |
|---|---|---|---|---|---|---|
| | k | A4 | A6 | A8 | A10 | A12 |
| R1 | 1.8351E+00 | −6.7090E−02 | −3.2457E−02 | −3.1931E−01 | 2.0500E+00 | −8.7444E+00 |
| R2 | 6.7094E+01 | −9.0149E−02 | −7.9340E−02 | −3.2683E−01 | 2.9700E+00 | −1.5716E+01 |
| R3 | 3.1277E+00 | −1.1866E−01 | −6.6326E−01 | 6.3662E+00 | −3.6480E+01 | 1.3189E+02 |
| R4 | −9.9000E+01 | 4.2693E−02 | −2.9716E−01 | 2.9676E+00 | −1.2863E+01 | 3.5567E+01 |
| R5 | −7.9351E+01 | −3.9845E−02 | −2.4490E−02 | 1.4617E−01 | −2.3694E−01 | 7.8598E−02 |
| R6 | 6.2889E+00 | −2.3170E−02 | −1.5759E−01 | 3.2637E−01 | −3.6152E−01 | 2.5674E−01 |
| R7 | −5.5841E+01 | 8.1735E−02 | −2.4827E−01 | 2.4840E−01 | −1.3230E−01 | 2.6089E−02 |
| R8 | −1.9977E+01 | 1.1810E−01 | −2.5920E−01 | 2.4141E−01 | −1.4634E−01 | 6.4123E−02 |
| R9 | −3.4413E+01 | −1.4809E−01 | −1.2692E−01 | 1.8625E−01 | −9.9375E−02 | 3.1517E−02 |
| R10 | −4.1104E+00 | −2.0525E−01 | 1.0954E−01 | −4.3251E−02 | 1.3609E−02 | −3.3576E−03 |

| | Conic coefficient | Aspherical surface coefficient | | | |
|---|---|---|---|---|---|
| | k | A14 | A16 | A18 | A20 |
| R1 | 1.8351E+00 | 2.1700E+01 | −3.2170E+01 | 2.6185E+01 | −9.1826E+00 |
| R2 | 6.7094E+01 | 4.9698E+01 | −9.1674E+01 | 9.1162E+01 | −3.7835E+01 |
| R3 | 3.1277E+00 | −3.0025E+02 | 4.1690E+02 | −3.2178E+02 | 1.0549E+02 |
| R4 | −9.9000E+01 | −6.2341E+01 | 6.6813E+01 | −3.9764E+01 | 1.0004E+01 |
| R5 | −7.9351E+01 | 2.2650E−01 | −3.4231E−01 | 1.9531E−01 | −4.0294E−02 |
| R6 | 6.2889E+00 | −1.1915E−01 | 3.4754E−02 | −5.7657E−03 | 4.1450E−04 |
| R7 | −5.5841E+01 | 9.1862E−03 | −6.3513E−03 | 1.3342E−03 | −9.9961E−05 |
| R8 | −1.9977E+01 | −2.0535E−02 | 4.5106E−03 | −5.8988E−04 | 3.3722E−05 |
| R9 | −3.4413E+01 | −6.5576E−03 | 8.9060E−04 | −7.2060E−05 | 2.6301E−06 |
| R10 | −4.1104E+00 | 6.0340E−04 | −7.1710E−05 | 4.9774E−06 | −1.5277E−07 |

Design data of the inflection point and the arrest point of each lens in the camera optical lens 20 are shown in Tables 7 and 8.

TABLE 7

| | Number of inflexion points | Inflexion point position 1 | Inflexion point position 2 | Inflexion point position 3 |
|---|---|---|---|---|
| P1R1 | 0 | / | / | / |
| P1R2 | 1 | 0.345 | / | / |
| P2R1 | 0 | / | / | / |
| P2R2 | 0 | / | / | / |
| P3R1 | 1 | 0.455 | / | / |
| P3R2 | 1 | 0.555 | / | / |
| P4R1 | 2 | 0.555 | 1.385 | / |
| P4R2 | 2 | 1.595 | 1.765 | / |
| P5R1 | 3 | 0.315 | 1.275 | 2.075 |
| P5R2 | 2 | 0.495 | 2.055 | / |

TABLE 8

| | Number of arrest points | Arrest point position 1 |
|---|---|---|
| P1R1 | 0 | / |
| P1R2 | 1 | 0.555 |
| P2R1 | 0 | / |
| P2R2 | 0 | / |
| P3R1 | 1 | 0.805 |
| P3R2 | 0 | / |
| P4R1 | 1 | 0.895 |
| P4R2 | 0 | / |
| P5R1 | 1 | 0.545 |
| P5R2 | 1 | 1.065 |

In addition, Table 13 below shows numerical values according to Embodiment 2 corresponding to the parameters specified in the conditions. It is appreciated that the camera optical lens of Embodiment 2 satisfies the above conditions.

Figure 6:
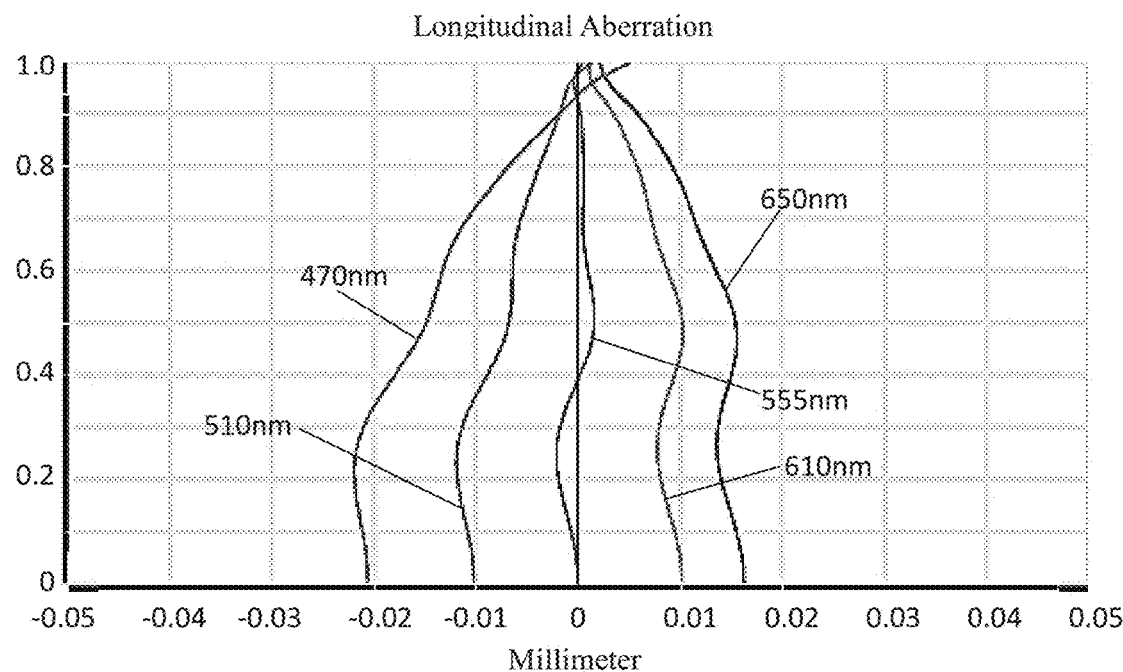
FIG. 6 is a schematic diagram of a longitudinal aberration of the camera optical lens shown in FIG. 5.
Figure 7:
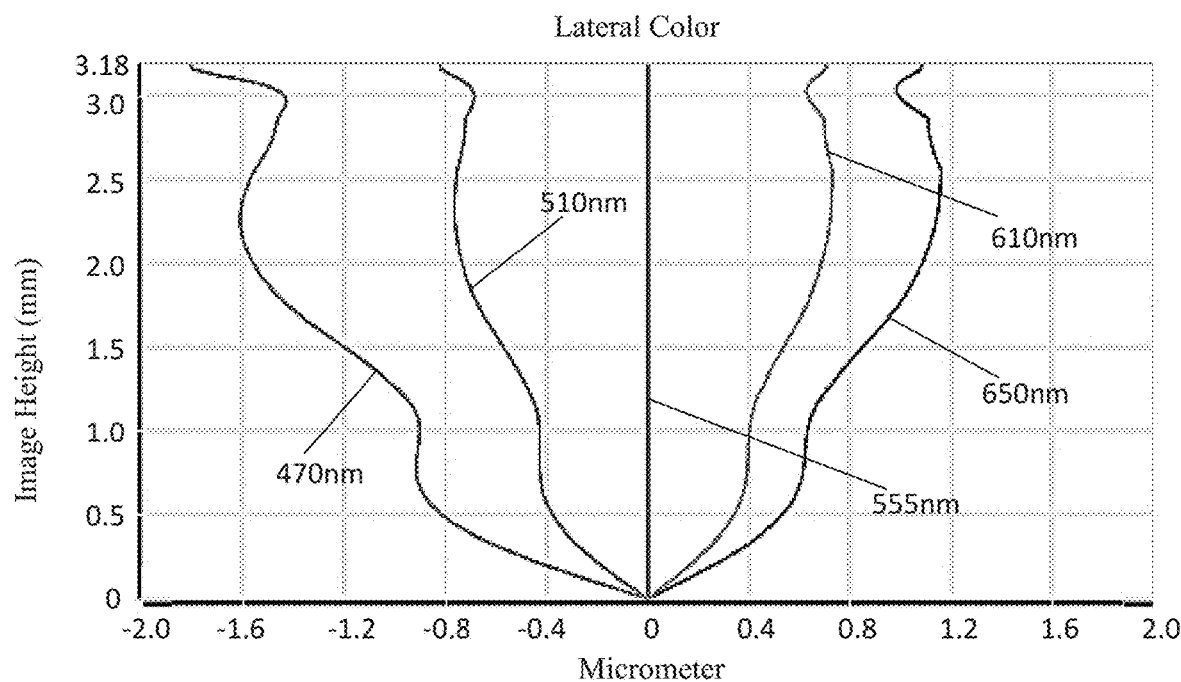
FIG. 7 is a schematic diagram of a lateral color of the camera optical lens shown in FIG. 5.
Figure 8:
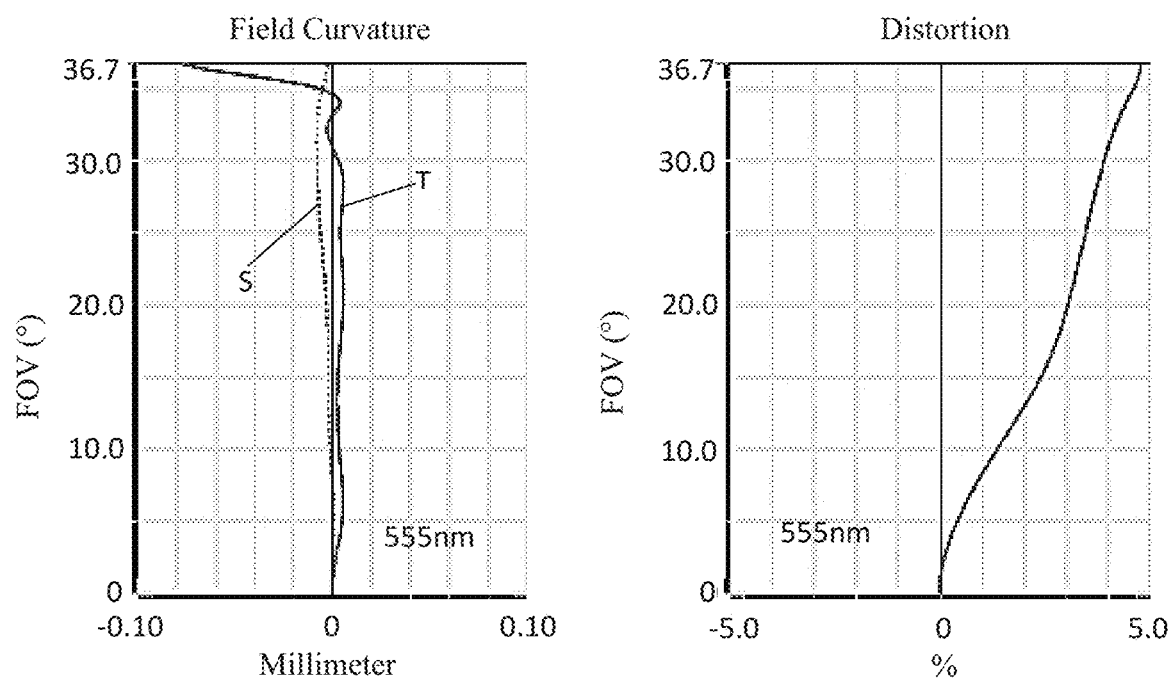
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 650 nm, 610 nm, 555 nm, 510 nm, and 470 nm passes through the camera optical lens 20, respectively. FIG. 8 is a schematic diagram of a field curvature and a distortion of the camera optical lens 20 after light having a wavelength of 555 nm passes through the camera optical lens 20. The field curvature S in FIG. 8 is a field curvature in a sagittal direction, and T is a field curvature in a meridian direction.

In this embodiment, an entrance pupil diameter ENPD of the camera optical lens 20 is 1.631 mm, a full-field image height IH is 3.182 mm, and a field of view FOV in a diagonal direction is 73.40°. The camera optical lens 20 satisfies design requirements for large aperture, wide angle and ultra-thinness. The on-axis and off-axis chromatic aberrations are fully corrected, thereby achieving excellent optical performances.

Embodiment 3

Figure 9:
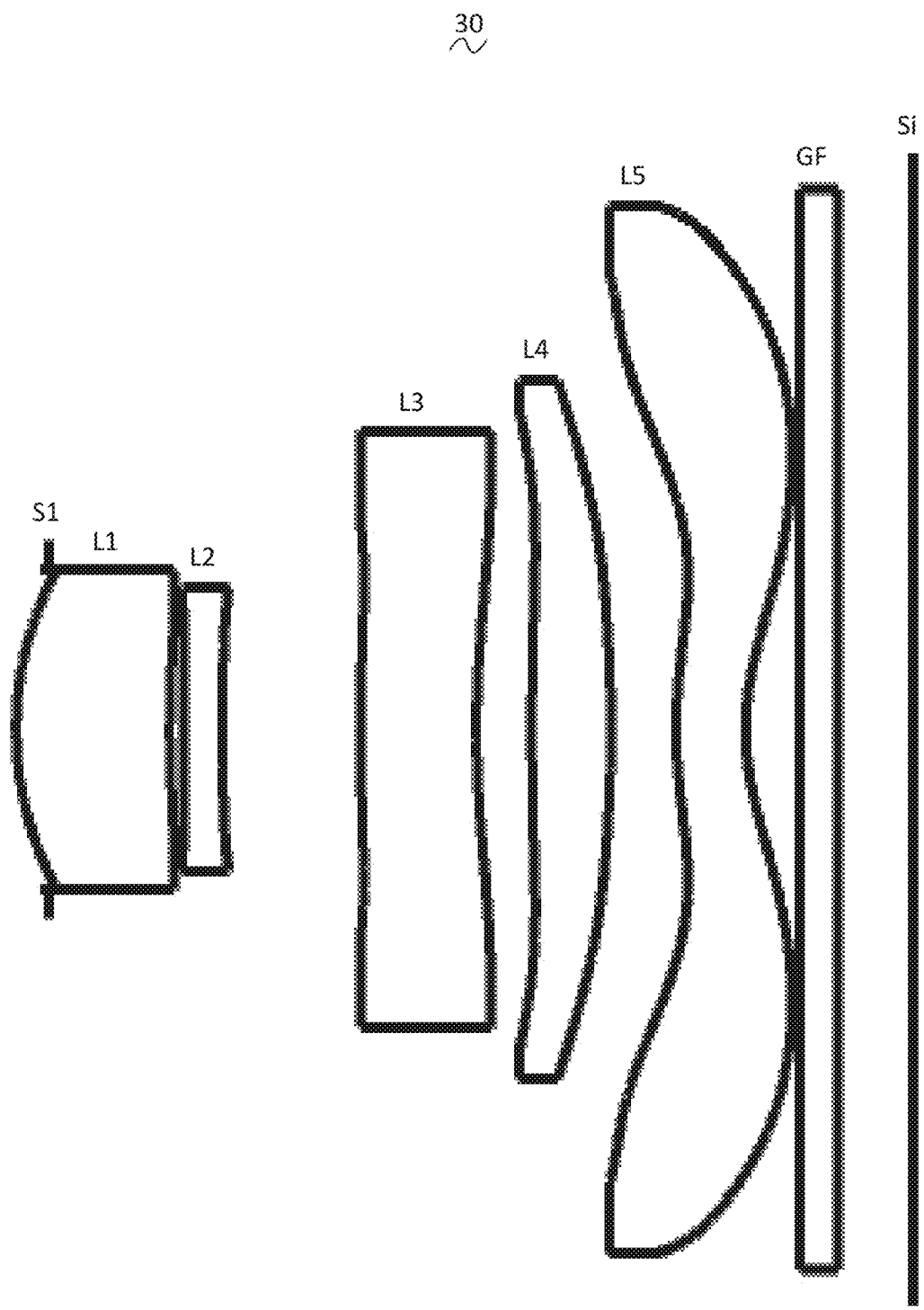
FIG. 9 is a structural schematic diagram of a camera optical lens according to Embodiment 3 of the present invention.

FIG. 9 is a structural schematic diagram of the camera optical lens 30 according to Embodiment 3. Embodiment 3 is basically the same as Embodiment 1, and involves symbols having the same meanings as Embodiment 1 which are not elaborated here, and only differences therebetween are listed below.

In this embodiment, an object side surface of a second lens L2 is convex in a paraxial region, and an image side surface of the second lens L2 is concave in the paraxial region.

Design data of the camera optical lens 30 of Embodiment 3 of the present invention are shown in Table 9 and Table 10.

TABLE 9

| | R | d | | nd | | vd | |
|---|---|---|---|---|---|---|---|
| S1 | ∞ | d0 = | −0.172 | | | | |
| R1 | 1.495 | d1 = | 0.815 | nd1 | 1.5444 | v1 | 55.82 |
| R2 | 4.534 | d2 = | 0.078 | | | | |

TABLE 9-continued

|     | R      | d      |     | nd     |    | vd    |
|-----|--------|--------|-----|--------|----|-------|
| R3  | 48.557 | d3 = 0.200 | nd2 | 1.6700 | v2 | 19.39 |
| R4  | 10.510 | d4 = 0.733 |     |        |    |       |
| R5  | 7.228  | d5 = 0.616 | nd3 | 1.6700 | v3 | 19.39 |
| R6  | 4.309  | d6 = 0.293 |     |        |    |       |
| R7  | 21.538 | d7 = 0.421 | nd4 | 1.6359 | v4 | 23.82 |
| R8  | −5.523 | d8 = 0.345 |     |        |    |       |
| R9  | 1.986  | d9 = 0.369 | nd5 | 1.5661 | v5 | 37.71 |
| R10 | 1.145  | d10 = 0.283 |    |        |    |       |
| R11 | ∞      | d11 = 0.210 | ndg | 1.5168 | vg | 64.17 |
| R12 | ∞      | d12 = 0.392 |    |        |    |       |

Table 10 shows aspherical surface data of each lens in the camera optical lens 30 of Embodiment 3 of the present invention.

TABLE 10

| | Conic coefficient | Aspherical surface coefficient | | | | |
|---|---|---|---|---|---|---|
|   | k | A4 | A6 | A8 | A10 | A12 |
| R1  | 1.7795E+00  | −6.8413E−02 | −4.8469E−02 | −2.7017E−01 |  1.8925E+00 | −9.2784E+00 |
| R2  | 4.1672E+01  | −1.7640E−01 |  2.2250E−01 | −7.1309E+00 |  7.6782E+01 | −4.8703E+02 |
| R3  | −9.9000E+01 | −1.1695E−01 | −2.2955E−01 |  4.5839E+00 | −4.1949E+01 |  2.4764E+02 |
| R4  | 4.7476E+01  | −1.0759E−02 | −3.0788E−02 |  1.9967E+00 | −1.4059E+01 |  6.7683E+01 |
| R5  | −7.7672E+01 | −3.4845E−02 | −6.1328E−02 |  1.9178E−01 | −3.6914E−01 |  3.8983E−01 |
| R6  | 3.9629E+00  | −3.9559E−02 | −9.5166E−02 |  1.9942E−01 | −2.3349E−01 |  1.7838E−01 |
| R7  | −2.4076E+01 |  7.5623E−02 | −1.6639E−01 |  1.1655E−01 | −2.8515E−02 | −1.3374E−02 |
| R8  | −2.4938E+01 |  5.6548E−02 | −1.1431E−01 |  6.3444E−02 |  4.4617E−03 | −2.4857E−02 |
| R9  | −1.5810E+01 | −5.5427E−02 | −2.5739E−01 |  3.4163E−01 | −2.2070E−01 |  8.6735E−02 |
| R10 | −2.9015E+00 | −1.8106E−01 |  6.4406E−02 |  2.4666E−04 | −9.8377E−03 |  3.9868E−03 |

| | Conic coefficient | Aspherical surface coefficient | | | |
|---|---|---|---|---|---|
|   | k | A14 | A16 | A18 | A20 |
| R1  | 1.7795E+00  |  2.5880E+01 | −4.2985E+01 |  3.9027E+01 | −1.5242E+01 |
| R2  | 4.1672E+01  |  1.8766E+03 | −4.3348E+03 |  5.5192E+03 | −2.9899E+03 |
| R3  | −9.9000E+01 | −9.0617E+02 |  1.9878E+03 | −2.3917E+03 |  1.2139E+03 |
| R4  | 4.7476E+01  | −2.0970E+02 |  3.9708E+02 | −4.1749E+02 |  1.8687E+02 |
| R5  | −7.7672E+01 | −1.9535E−01 | −9.1861E−03 |  5.0473E−02 | −1.4875E−02 |
| R6  | 3.9629E+00  | −8.9422E−02 |  2.8085E−02 | −4.9752E−03 |  3.7718E−04 |
| R7  | −2.4076E+01 |  1.2617E−02 | −4.0924E−03 |  6.3342E−04 | −3.9410E−05 |
| R8  | −2.4938E+01 |  1.4412E−02 | −4.0392E−03 |  5.7588E−04 | −3.3513E−05 |
| R9  | −1.5810E+01 | −2.1421E−02 |  3.2393E−03 | −2.7392E−04 |  9.9130E−06 |
| R10 | −2.9015E+00 | −7.5800E−04 |  7.0770E−05 | −2.2528E−06 | −4.5169E−08 |

Design data of the inflection point and the arrest point of each lens in the camera optical lens 30 are shown in Table 11 and Table 12.

TABLE 11

|      | Number of inflexion points | Inflexion point position 1 | Inflexion point position 2 | Inflexion point position 3 |
|------|---|-------|-------|-------|
| P1R1 | 0 | /     | /     | /     |
| P1R2 | 2 | 0.385 | 0.655 | /     |
| P2R1 | 2 | 0.125 | 0.585 | /     |
| P2R2 | 0 | /     | /     | /     |
| P3R1 | 1 | 0.425 | /     | 1     |
| P3R2 | 1 | 0.615 | /     | /     |
| P4R1 | 2 | 0.585 | 1.515 | /     |
| P4R2 | 2 | 1.565 | 1.675 | /     |
| P5R1 | 3 | 0.405 | 1.455 | 2.045 |
| P5R2 | 1 | 0.565 | /     | /     |

TABLE 12

|      | Number of arrest points | Arrest point position 1 |
|------|---|-------|
| P1R1 | 0 | /     |
| P1R2 | 0 | /     |
| P2R1 | 1 | 0.205 |
| P2R2 | 0 | /     |
| P3R1 | 1 | 0.735 |
| P3R2 | 1 | 1.265 |
| P4R1 | 1 | 0.865 |
| P4R2 | 0 | /     |
| P5R1 | 1 | 0.735 |
| P5R2 | 1 | 1.325 |

In addition, Table 13 below shows numerical values according to Embodiment 3 corresponding to the parameters specified in the conditions. It is appreciated that the camera optical lens of Embodiment 3 satisfies the above conditions.

Figure 10:
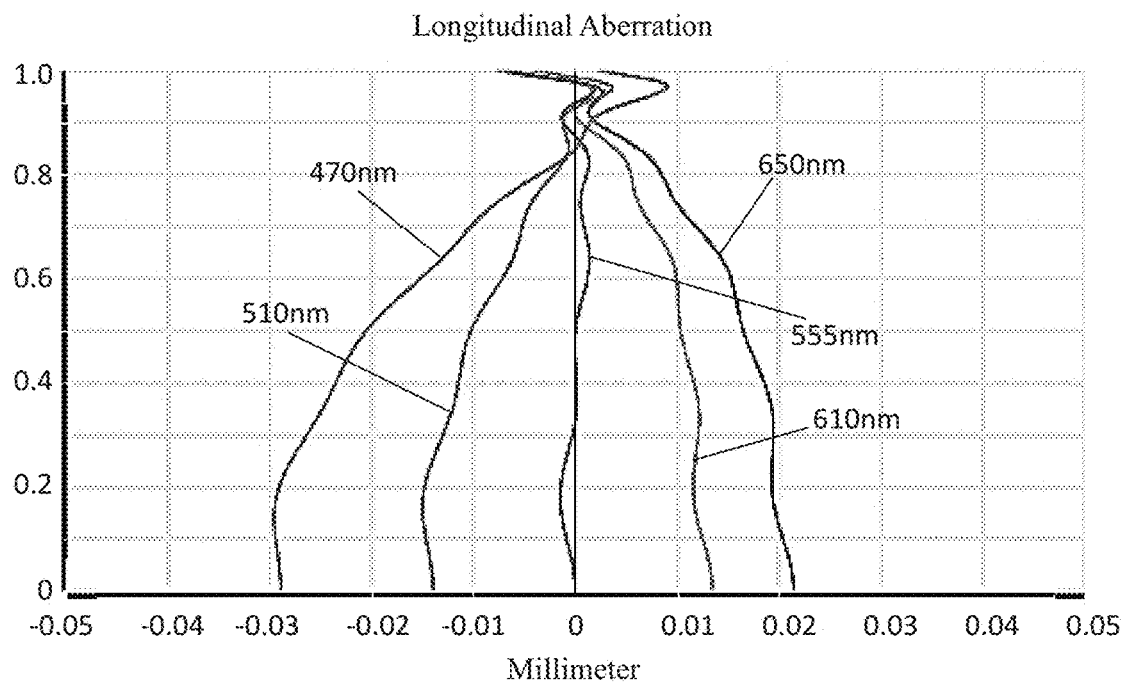
FIG. 10 is a schematic diagram of a longitudinal aberration of the camera optical lens shown in FIG. 9.
Figure 11:
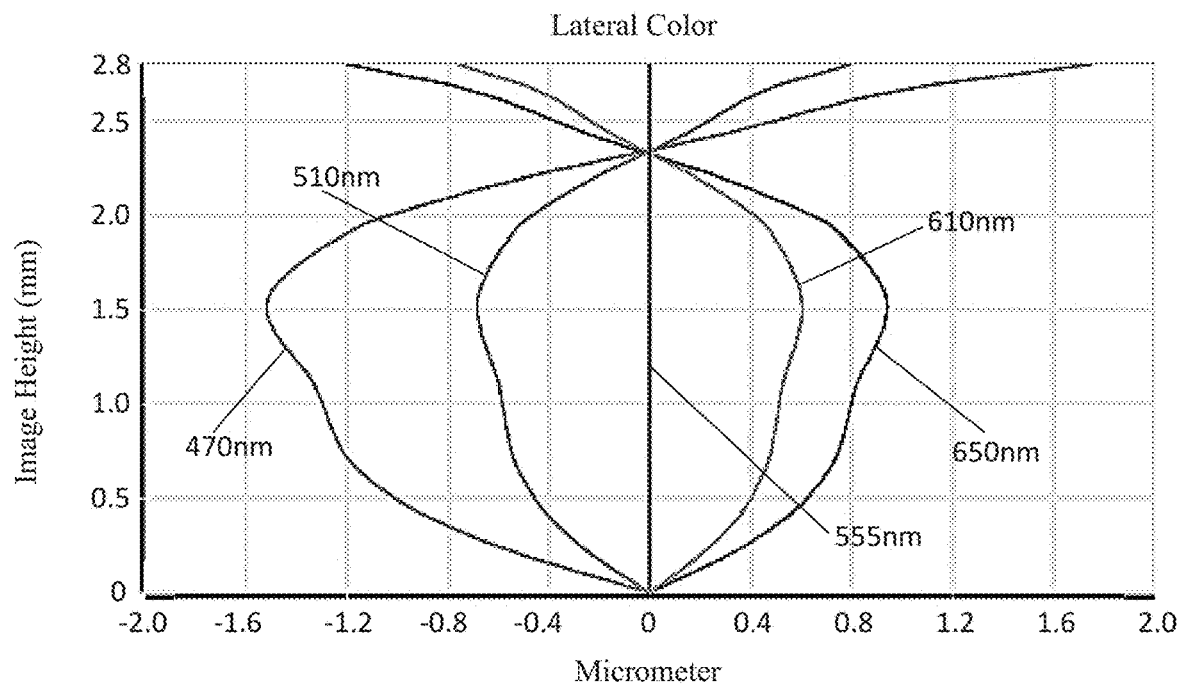
FIG. 11 is a schematic diagram of a lateral color of the camera optical lens shown in FIG. 9.
Figure 12:
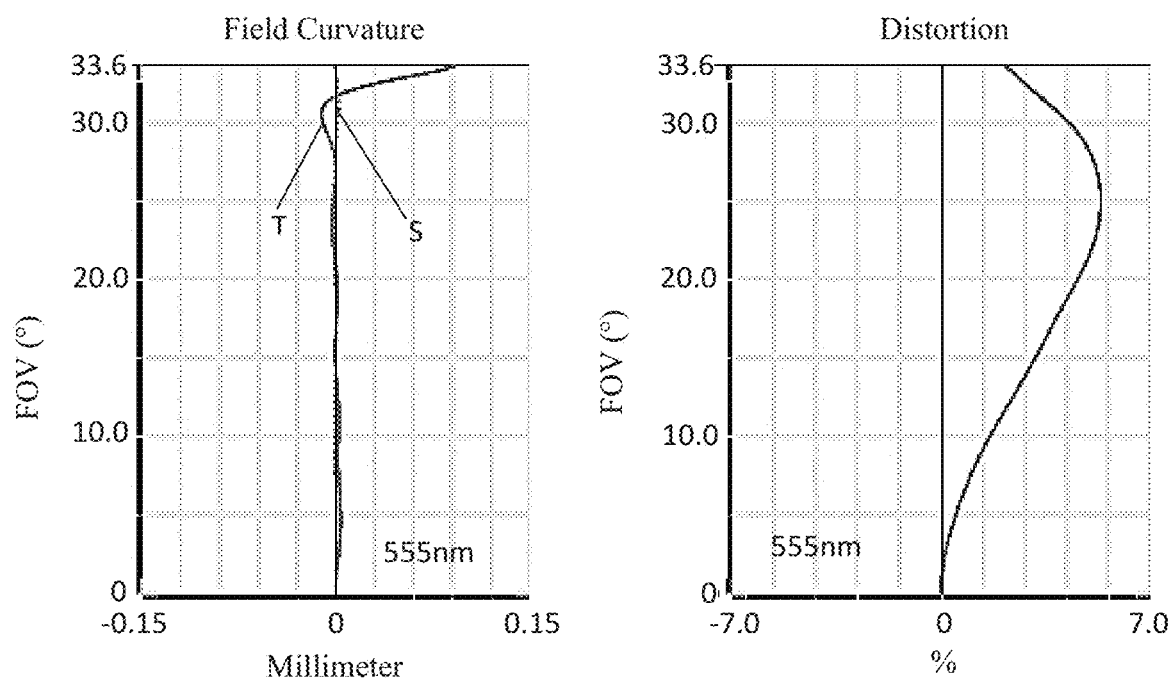
FIG. 12 is a schematic diagram of a field curvature and a distortion of the camera optical lens shown in FIG. 9.

FIG. 10 and FIG. 11 are schematic diagrams of a longitudinal aberration and a lateral color of the camera optical lens 30 after light having a wavelength of 650 nm, 610 nm, 555 nm, 510 nm, and 470 nm passes through the camera optical lens 30, respectively. FIG. 12 is a schematic diagram of a field curvature and a distortion of the camera optical lens 30 after light having a wavelength of 555 nm passes through the camera optical lens 20. The field curvature S in FIG. 12 is a field curvature in a sagittal direction, and T is a field curvature in a meridian direction.

In this embodiment, an entrance pupil diameter ENPD of the camera optical lens 30 is 1.555 mm, a full-field image height IH is 2.800 mm, and a field of view FOV in a diagonal direction is 67.20°. The camera optical lens 30 satisfies design requirements for large aperture, wide angle and ultra-thinness. The on-axis and off-axis chromatic aberrations are fully corrected, thereby achieving excellent optical performances.

Table 13 below shows numerical values corresponding to each condition in Embodiments 1, 2, and 3 according to the above conditions, and values of other related parameters.

TABLE 13

| Parameters and conditions | Embodiment 1 | Embodiment 2 | Embodiment 3 |
|---|---|---|---|
| f2/f | −3.70 | −2.55 | −4.92 |
| d5/d6 | 3.14 | 3.89 | 2.10 |
| R7/R8 | −1.84 | −1.31 | −3.90 |
| (R1 + R2)/(R1 − R2) | −1.06 | −1.52 | −1.98 |
| f | 3.772 | 3.995 | 4.042 |
| f1 | 2.986 | 3.368 | 3.731 |
| f2 | −13.968 | −10.187 | −19.878 |
| f3 | −7.639 | −24.008 | −17.246 |
| f4 | 3.005 | 5.282 | 6.902 |
| f5 | −2.338 | −3.948 | −5.659 |
| f12 | 3.565 | 4.350 | 4.339 |
| FNO | 2.45 | 2.45 | 2.60 |
| TTL | 4.587 | 4.828 | 4.755 |
| FOV | 80.00° | 73.40° | 67.20° |
| IH | 3.282 | 3.182 | 2.800 |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:
   a first lens having positive refractive power;
   a second lens having negative refractive power;
   a third lens having negative refractive power;
   a fourth lens having positive refractive power; and
   a fifth lens having negative refractive power,
   wherein the camera optical lens satisfies following conditions:

$-5.00 \leq f2/f \leq -2.50$;

$2.00 \leq d5/d6 \leq 4.00$;

$-4.00 \leq R7/R8 \leq -1.30$;

$-2.00 \leq (R1+R2)/(R1-R2) \leq -1.00$, $0.59 \leq (R9+R10)/(R9-R10) \leq 5.58$; and $0.04 \leq d9/TTL \leq 0.12$, where
   f denotes a total focal length of the camera optical lens;
   f2 denotes a focal length of the second lens;
   R1 denotes a curvature radius of an object side surface of the first lens;
   R2 denotes a curvature radius of an image side surface of the first lens;
   R7 denotes a curvature radius of an object side surface of the fourth lens;
   R8 denotes a curvature radius of an image side surface of the fourth lens;
   d5 denotes an on-axis thickness of the third lens;
   d6 denotes an on-axis distance from an image side surface of the third lens to the object side surface of the fourth lens;
   R9 denotes a curvature radius of an object side surface of the fifth lens;
   R10 denotes a curvature radius of an image side surface of the fifth lens;
   d9 denotes an on-axis thickness of the fifth lens; and
   TTL denotes a total optical length from the object side surface of the first lens to an image plane of the camera optical lens along an optic axis.

2. The camera optical lens as described in claim 1, wherein the camera optical lens further satisfies a following condition:

$-1.50 \leq f5/f \leq -0.50$, where f5 denotes a focal length of the fifth lens.

3. The camera optical lens as described in claim 1, wherein the camera optical lens further satisfies following conditions:

$0.40 \leq f1/f \leq 1.38$; and $0.09 \leq d1/TTL \leq 0.40$, where
   f1 denotes a focal length of the first lens;
   d1 denotes an on-axis thickness of the first lens.

4. The camera optical lens as described in claim 1, wherein the camera optical lens further satisfies following conditions:

$-7.46 \leq (R3+R4)/(R3-R4) \leq 2.33$; and $0.02 \leq d3/TTL \leq 0.07$, where
   R3 denotes a curvature radius of an object side surface of the second lens;
   R4 denotes a curvature radius of an image side surface of the second lens;
   d3 denotes an on-axis thickness of the second lens.

5. The camera optical lens as described in claim 1, wherein the camera optical lens further satisfies following conditions:

$-12.02 \leq f3/f \leq -1.35$;

$0.52 \leq (R5+R6)/(R5-R6) \leq 6.70$; and $0.04 \leq d5/TTL \leq 0.23$, where
   f3 denotes a focal length of the third lens;
   R5 denotes a curvature radius of an object side surface of the third lens;
   R6 denotes a curvature radius of the image side surface of the third lens.

6. The camera optical lens as described in claim 1, wherein the camera optical lens further satisfies following conditions:

$0.40 \leq f4/f \leq 2.56$;

$0.07 \leq (R7+R8)/(R7-R8) \leq 0.89$; and $0.04 \leq d7/TTL \leq 0.25$, where
   f4 denotes a focal length of the fourth lens;
   d7 denotes an on-axis thickness of the fourth lens.

7. The camera optical lens as described in claim 1, wherein the camera optical lens further satisfies a following condition:

$FNO \leq 2.60$, where FNO denotes an F number of the camera optical lens.

8. The camera optical lens as described in claim 1, wherein the camera optical lens further satisfies a following condition:

$FOV \geq 67.00°$, where FOV denotes a field of view of the camera optical lens.

9. The camera optical lens as described in claim 1, wherein the camera optical lens further satisfies a following condition:

$TTL/IH \leq 1.70$, where
IH denotes an image height of the camera optical lens.

\* \* \* \* \*